(12) United States Patent
Epstein et al.

(10) Patent No.: US 9,407,941 B2
(45) Date of Patent: Aug. 2, 2016

(54) DISTRIBUTING AUDIO VIDEO CONTENT

(75) Inventors: Steve Epstein, Hashmonaim (IL); Hillel Solow, Beit Shemesh (IL); Yaron Sella, Beit Nekofa (IL); Aviad Kipnis, Efrat (IL); Avraham Poupko, Jerusalem (IL)

(73) Assignee: Cisco Technology Inc., San Jose, CA (US)

( * ) Notice: Subject to any disclaimer, the term of this patent is extended or adjusted under 35 U.S.C. 154(b) by 40 days.

(21) Appl. No.: 14/126,722

(22) PCT Filed: Jun. 21, 2012

(86) PCT No.: PCT/IB2012/053150
§ 371 (c)(1),
(2), (4) Date: Jan. 13, 2014

(87) PCT Pub. No.: WO2013/001426
PCT Pub. Date: Jan. 3, 2013

(65) Prior Publication Data
US 2014/0150046 A1    May 29, 2014

(30) Foreign Application Priority Data

Jun. 30, 2011    (GB) .................................. 1111130.9

(51) Int. Cl.
*H04N 21/2343*    (2011.01)
*H04N 21/235*    (2011.01)
(Continued)

(52) U.S. Cl.
CPC ........ *H04N 21/2343* (2013.01); *H04L 65/4076* (2013.01); *H04L 65/80* (2013.01);
(Continued)

(58) Field of Classification Search
None
See application file for complete search history.

(56) References Cited

U.S. PATENT DOCUMENTS 6,614,448 B1 *    9/2003    Garlick ................. G06T 11/001
345/3.3
2006/0129909 A1 *    6/2006    Butt et al. ................... 715/500.1
(Continued)

FOREIGN PATENT DOCUMENTS

WO    WO 2007/130695 A2    11/2007
WO    WO 2010/108053 A1    9/2010

OTHER PUBLICATIONS

Oct. 12, 2012 Transmittal of International Search Report and Written Opinion of the International Searching Authority for PCT/IB2012/053150.
(Continued)

*Primary Examiner* — Brian T Pendleton
*Assistant Examiner* — Jean D Saint Cyr
(74) *Attorney, Agent, or Firm* — Hahn Loeser & Parks, LLP

(57) ABSTRACT

A method of distributing audio video content is described. The method includes: receiving configuration data for a plurality of devices; for each device in the plurality of devices, computing a set of bit rates based, at least in part, on the configuration data; encoding audio video content at each bit rate in each set of bit rates to produce a plurality of encoded audio video content streams; splitting each encoded audio video content stream in the plurality of encoded audio video content streams into chunks to produce a plurality of chunked encoded audio video content streams; for each device in the plurality of devices, creating a separate index file, each separate index file including references to at least one of the plurality of chunked encoded audio video content streams; publishing a locator for each separate index file in a catalogue; and transmitting the plurality of chunked encoded audio video content streams and each separate index file to a network. Related systems, apparatus, and methods are also described.

15 Claims, 3 Drawing Sheets

(51) Int. Cl.
*H04N 21/236* (2011.01)
*H04N 21/2365* (2011.01)
*H04N 21/238* (2011.01)
*H04N 21/2385* (2011.01)
*H04N 21/462* (2011.01)
*H04N 21/258* (2011.01)
*H04N 21/643* (2011.01)
*H04N 21/854* (2011.01)
*H04N 21/8543* (2011.01)
*H04L 29/06* (2006.01)

(52) U.S. Cl.
CPC ... *H04N21/23439* (2013.01); *H04N 21/25825* (2013.01); *H04N 21/25858* (2013.01); *H04N 21/643* (2013.01); *H04N 21/8543* (2013.01); *H04N 21/85406* (2013.01)

(56) References Cited

U.S. PATENT DOCUMENTS

| | | | |
|---|---|---|---|
| 2009/0279605 A1* | 11/2009 | Holcomb | H04N 19/147 375/240.03 |
| 2009/0319563 A1 | 12/2009 | Schnell | |
| 2010/0138646 A1* | 6/2010 | Aloni et al. | 713/150 |
| 2010/0186034 A1* | 7/2010 | Walker | H04N 21/4334 725/40 |
| 2010/0189183 A1 | 7/2010 | Gu et al. | |
| 2011/0082924 A1 | 4/2011 | Gopalakrishnan | |
| 2012/0144445 A1* | 6/2012 | Bonta | H04L 12/1868 725/116 |

OTHER PUBLICATIONS

Oct. 27, 2011 Office Communication in connection with prosecution of GB 111 1130.9.
Dec. 12, 2012 Office Communication in connection with prosecution of GB 111 1130.9.
Gerard Fernando et al., "Http Streaming Solution—Response to Call for Proposal" (ISO/IEC JTCI/1/SC29/WG11/M17756, Jul. 2010).
Hendrik Knoche et al., "Can Small Be Beautiful? Assessing Image Resolution Requirements for Mobile TV," *MM '05*. pp. 829-834 (ACM Nov. 11, 2005).
Jin Young Lee et al. (ed.), "Dash Evaluation Experiment #1: Compositions of Media Presentation (CMP) Proposal Comparison" (ISO/IEC/JTC1/SC29/WG11, MPEG2010/M18009, Oct. 2010).
Thomas Stockhammer et al. (ed.), "Text of ISO/IEC 23001-6: Dynamic Adaptive Streaming Over Http (Dash)"(ISO/IEC JTCI/SC29/WG11, MPEG/N11578, Oct. 2010).
"Http Live Streaming" *Wikipedia* (Mar. 4, 2011).
"Media Presentation Description in Http Streaming" (Telefon AB LM Ericsson Jan. 29, 2010).
Dec. 12, 2013 Office Communication in connection with prosecution of GB 111 1130.9.
Feb. 12, 2014 Amendment and Response to Examination Report in GB 111 1130.9.
May 6, 2014 Notification of Grant in GB 111 1130.9.

* cited by examiner

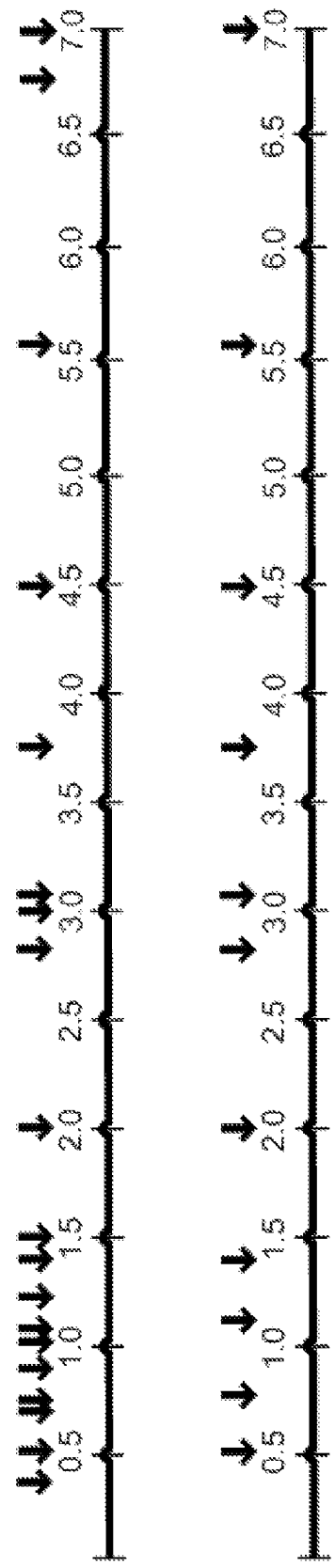

DISTRIBUTING AUDIO VIDEO CONTENT

The present application is a 35 USC §371 submission of international application no. PTC/IB 2012/053150, filed 21 Jun. 2012 and published in the English language on 3 Jan. 2013 with publication no. WO 2013/001426 A1, which claims the benefit of the filing date of GB 11111130.9, filed 30 Jun. 2011.

FIELD OF THE INVENTION

The present invention relates to a method and apparatus for distributing audio video content.

BACKGROUND OF THE INVENTION

Adaptive Bitrate (ABR) Streaming is a technique used in streaming multimedia over computer networks that works by detecting a user's bandwidth and central processing unit (CPU) capacity in real time and adjusting the quality of a video stream accordingly. It uses an encoder that can encode a single source audio video (AV) file at multiple bit rates. The player client switches between streaming the different encodings depending on available resources.

One example of an ABR streaming technology is HTTP Live Streaming, an HTTP-based media streaming communications protocol implemented by Apple Inc. It works by breaking the overall stream into a sequence of small HTTP-based media file downloads, each media file download containing one short chunk of an overall potentially unbounded transport stream. As the stream is played, the client may select from a number of different alternate streams containing the same material encoded at a variety of data rates, allowing the streaming session to adapt to the available data rate. At the start of the streaming session, the client downloads an extended M3U playlist (a type of index file) containing references to the individual media files for the various sub-streams which are available.

SUMMARY OF THE INVENTION

There is thus provided in accordance with an embodiment of the present invention a method of distributing audio video content, the method including: receiving configuration data for a plurality of devices; for each device in the plurality of devices, computing a set of bit rates based, at least in part, on the configuration data; encoding audio video content at each bit rate in each set of bit rates to produce a plurality of encoded audio video content streams; splitting each encoded audio video content stream in the plurality of encoded audio video content streams into chunks to produce a plurality of chunked encoded audio video content streams; for each device in the plurality of devices, creating a separate index file, each separate index file including references to at least one of the plurality of chunked encoded audio video content streams; publishing a locator for each separate index file in a catalogue; and transmitting the plurality of chunked encoded audio video content streams and each separate index file to a network.

Further, in accordance with an embodiment of the invention, the configuration data includes, for each device in the plurality of devices, one or more of: an indication of device type, screen size, operating system, maximum video resolution, and minimum bit rate.

Still further, in accordance with an embodiment of the invention, the maximum video resolution includes a maximum video resolution supported by the device and a maximum useful video resolution, the maximum useful video resolution including a video resolution above which increases in video resolution will be imperceptible to a human eye.

Additionally, in accordance with an embodiment of the invention, the method further includes: computing a maximum bit rate from the maximum useful video resolution.

Moreover, in accordance with an embodiment of the invention, each set of bit rates includes: the minimum bit rate, the maximum bit rate, and at least one intermediate bit rate between the minimum bit rate and the maximum bit rate.

Further, in accordance with an embodiment of the invention, the method further includes: receiving an indication of a number of bit rates to be computed for each set of bit rates; computing a bit rate differential from the number of bit rates, the maximum bit rate and the minimum bit rate; and computing the at least one intermediate bit rate using the bit rate differential.

Still further, in accordance with an embodiment of the invention, the method further includes: receiving a bit rate differential; and computing the at least one intermediate bit rate using the bit rate differential.

Additionally, in accordance with an embodiment of the invention, the bit rate differential is constant.

Moreover, in accordance with an embodiment of the invention, the bit rate differential varies with bit rate.

Further, in accordance with an embodiment of the invention, the method further includes: minimizing a total number of bit rates included in each set of bit rates.

Still further, in accordance with an embodiment of the invention, the method further includes: encrypting the chunked encoded audio video content streams before transmission.

Additionally, in accordance with an embodiment of the invention, the plurality of encoded audio video streams have a common format, and each index file has a format dependent on operating system.

Moreover, in accordance with an embodiment of the invention, the computing is additionally based on feedback received from one or more devices in said plurality of devices.

There is also provided in accordance with a further embodiment of the present invention apparatus for distributing audio video content, the apparatus including: means for receiving configuration data for a plurality of devices; means for computing, for each device in the plurality of devices, a set of bit rates based, at least in part, on the configuration data; means for encoding audio video content at each bit rate in each set of bit rates to produce a plurality of encoded audio video content streams; means for splitting each encoded audio video content stream in the plurality of encoded audio video content streams into chunks to produce a plurality of chunked encoded audio video content streams; means for creating, for each device in the plurality of devices, a separate index file, each separate index file including references to at least one of the plurality of chunked encoded audio video content streams; means for publishing a locator for each separate index file in a catalogue; and means for transmitting the plurality of chunked encoded audio video content streams and each separate index file to a network.

BRIEF DESCRIPTION OF THE DRAWINGS

The present invention will be understood and appreciated more fully from the following detailed description, taken in conjunction with the drawings, in which:

FIGS. 3a and 3b are representations of different bit-rates computed and optimized in accordance with embodiments of the present invention.

DETAILED DESCRIPTION OF EMBODIMENTS

Figure 1:
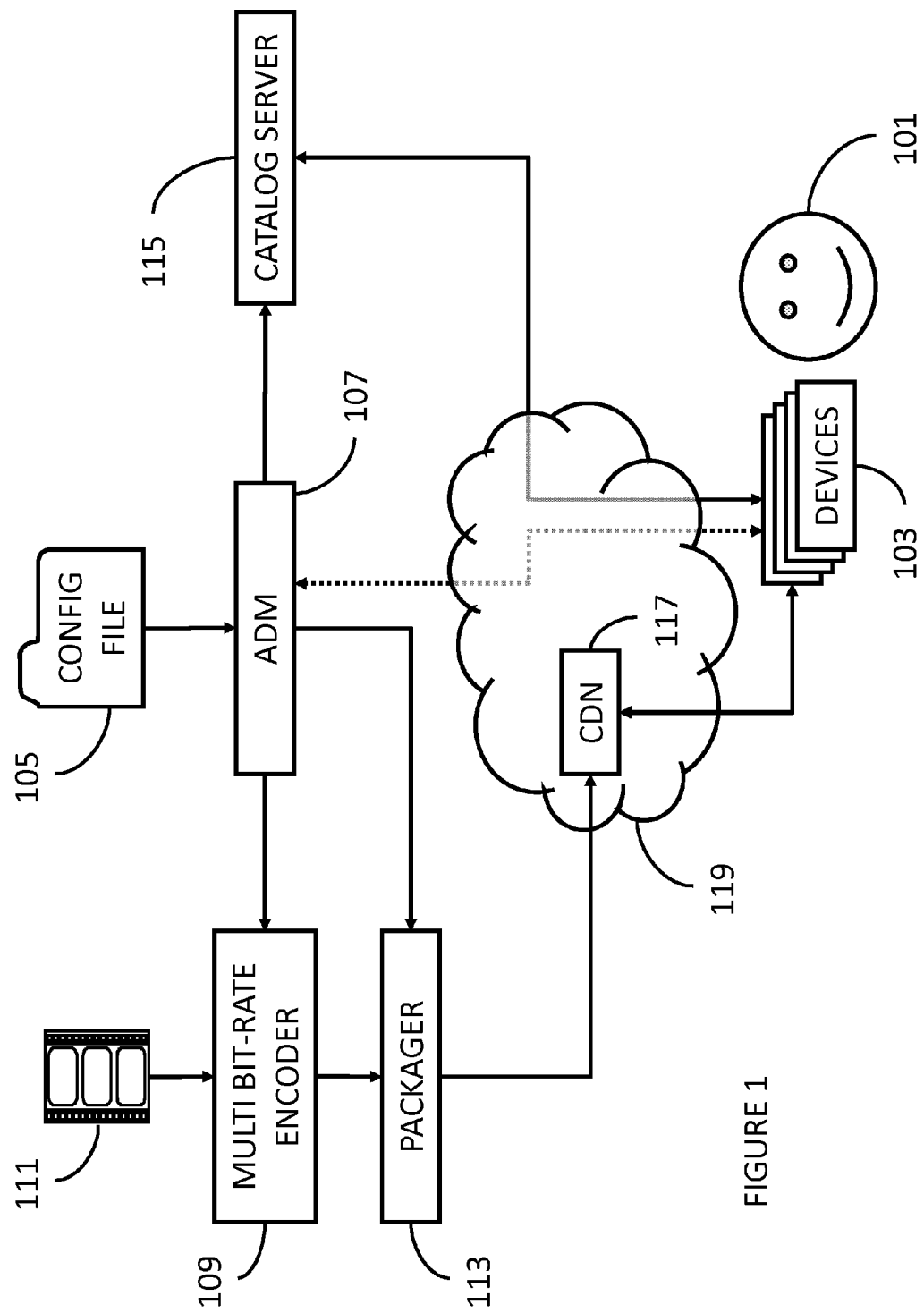
FIG. 1 is a simplified pictorial illustration of a system constructed and operative in accordance with embodiments of the present invention.

Reference is now made to FIG. 1, which shows a simplified pictorial illustration of a system constructed and operative in accordance with embodiments of the present invention.

Users 101 have available to them various types of devices 103 including, but not limited to, smartphones, tablet computers, palmtop computers, laptop computers, desktop computers, standard definition televisions, high definition televisions, etc.

A television operator, not shown, creates a configuration file 105 that lists the properties of the various devices available to users 101. An example of configuration file 105 is shown below:

```
Smartphone; 3.5; iOS; 0.4; 720p; 480i
Smartphone; 4.3; Android; 0.4; 720pi; 480i
Smartphone; 3.8; Windows 7; 0.4; 720p; 480i
Smartphone; 3.2; Blackberry; 0.4; 576i; 480i
Tablet; 9.7; iOS; 0.5; 720p; 480i
Tablet; 7; Android; 0.5; 720p; 576i
Tablet; 10; Android; 0.5; 720p; 720p
Tablet; 10; Windows 7; 0.5; 720p; 720p
Tablet; 7; Blackberry; 0.5; 720p; 576i
Laptop; 11; iOS; 0.6; 720p; 576p
Laptop; 13; iOS; 0.6; 720p; 576p
Laptop; 15; iOS; 0.6; 720p; 576p
Laptop; 17; iOS; 0.6; 720p; 576p
Laptop; 11; Windows 7; 0.6; 720p; 576p
Laptop; 13; Windows 7; 0.6; 720p; 576p
Laptop; 15; Windows 7; 0.6; 720p; 576p
Laptop; 17; Windows 7; 0.6; 720p; 720p
Desktop; 21.5; iOS; 0.7; 768 (4:3); 768 (4:3)
Desktop; 27; iOS; 0.8; 720p; 720p
Desktop; 19; Windows 7; 0.7; 768 (4:3); 768 (4:3)
Desktop; 22; Windows 7; 0.7; 768 (4:3); 768 (4:3)
Desktop; 24; Windows 7; 0.7; 720p; 720p
Desktop; 27; Windows 7; 0.8; 720p; 720p
SDTV; 28; Fusion; 0.9; 576p; 576p
SDTV; 42; Fusion; 1; 576p; 576p
HDTV; 28; Fusion; 2; 1080p; 720p
HDTV; 42; Fusion; 3; 1080p; 1080p
SDTV; 28; Fusion; 0.9; 576p; 576p
SDTV; 42; Fusion; 1; 576p; 576p
HDTV; 28; Fusion; 2; 1080p; 720p
HDTV; 42; Fusion; 3; 1080p; 1080p
```

In the present embodiment, the format of configuration file 105 is a list sextuplets having the form "D; SS; OS; MBR; MSR; MUR", where:

D indicates the type of device (e.g. Smartphone, Tablet, Laptop, Desktop, Standard Definition Television (SDTV), High Definition Television (HDTV), etc.);

SS indicates the screen size of the device in inches, which can vary from 3.5" for a smartphone up to 42" and larger for a television);

OS indicates the operating system running on the device (e.g. iOS from Apple, Android from Google, Windows 7 from Microsoft, Blackberry from RIM, Fusion (a set top box operating system) from NDS, etc.);

MiBR indicates the minimum bit rate (in megabits per second (Mbit/s)) of compressed video that is suitable for the display of video on the device;

MSR indicates the maximum video resolution supported by the device (e.g. 480i (853×480 interlaced), 576i (1024× 576 interlaced), 576p (1024×576 progressive scan), 720p (1280×720 progressive scan), 1080i (1920×1080 interlaced), 1080p (1920×1080 progressive scan), 768 (4:3) (1024×768 at 4:3 aspect ratio) etc.); and MUR indicates the maximum video resolution that is useful based on the screen size of the device (e.g. for devices with smaller screens, since the difference in picture quality between a lower resolution video (say 480i) and a higher resolution video (say 720p) will be imperceptible to the human eye, 480i may be said to be the maximum useful video resolution for such a device).

The maximum useful video resolution MUR can be used to calculate a maximum useful bit rate of compressed video that can usefully be processed by the device. An example formula for calculating the maximum useful bit rate (MaBR) in bits per second for compressed video is shown below:

$$MaBR = X*Y*FR*MR*0.07$$

where:

MaBR is the maximum useful bit rate for compressed video;

X is the number of horizontal pixels per frame;

Y is the number of vertical pixels per frame;

(It will be appreciated by those skilled in the art that the values for X and Y are obtainable from the resolution value in the configuration file (which gives an indication of the number of vertical pixels per frame, i.e. Y) and an aspect ratio (AR) where:

$$X = Y*AR$$

The aspect ratio is typically 16:9 but for certain resolutions may be 4:3 (as seen in the example configuration file shown above)).

FR is the frame rate (http://en.wikipedia.org/wiki/Frame_rate) (typically 24 frames per second (fps));

MR is the motion rank—an indication of the amount of motion in the video. Video can typically be classified into one of three motion ranks: low, medium, or high:

Low motion is a video that has minimal movement. For example, a person talking in front of a camera without moving much while the camera itself and the background is not moving at all;

Medium motion is a video with some degree of movement, but in a predictable and orderly manner, which means some relatively slow camera and subject movements, but not many scene changes or cuts or sudden snap camera movements or zooms where the entire picture changes into something completely different instantaneously; and High motion is video with a high degree of movement (e.g. an action movie trailer), where not only are the movements fast and unpredictable but the scenes also change very rapidly.

To convert this subjective factor into a quantitative factor, a multiplication factor is given to each rank. Since these ranks are not linear, the following numbers can be applied to the ranks: low=1, medium=2, high=4. In other words, a video with a reasonable amount of movement is twice as hard to compress compared to one that has very little to no movement. An extremely fast and unpredictable video would be four times as hard to compress while maintaining the same level of quality.

0.07 is a constant obtained through experimentation (for commonly used video frame-size and frame-rate ranges) used to obtain the estimate of the maximum useful bit rate.

Further details about the formula given above can be found in "H.264 For The Rest Of Us" by Kush Amerasinghe published by Adobe Systems Incorporated, and available at http://www.adobe.com/content/dam/Adobe/en/devnet/video/articles/h264_primer/h264 primer.pdf.

The table below shows some example values for the maximum useful bit rate (in megabits per second (Mbit/s)) for compressed video for different video resolutions calculated according to the above formula and assuming a frame rate of 24 fps and a motion rank of 2:

| Resolution | MaBR |
|---|---|
| 480i | 1.4 |
| 576i | 2.0 |
| 576p | 2.0 |
| 720p | 3.1 |
| 768 (4:3) | 2.6 |
| 1080p | 7.0 |

It will be appreciated that in alternative embodiments, the maximum useful bit rate could be provided in the configuration file in place of (or in addition to) the maximum useful resolution.

Configuration file 105 is transmitted to, and received by, ABR decision maker (ADM) 107. ADM 107 sets up the ABR configuration of the system in order to optimize the user experience of each user (of users 101) of each device (of devices 103) and minimize the bandwidth used in the system.

In order to set up the ABR configuration of the system, configuration file 105 also includes either an indication of the number of encoded streams (the number of sub-channels each at a different bit rate, also referred to as the number of bit-rates) that are to support each device of devices 103, or an indication of the optimal bit-rate differential(s) between encoded streams (sub-channels) that will enable a substantial yet seamless jump between bit rates on each device. In alternative embodiments, these additional bits of information may be provided to ADM 107 separate from configuration file 105.

In alternative embodiments, a total number of sub-channels (or total number of bit rates) that can be created for an item of audio video content, or a total bit-rate that can be supported across all sub-channels can be provided to ADM 107.

Figure 2:
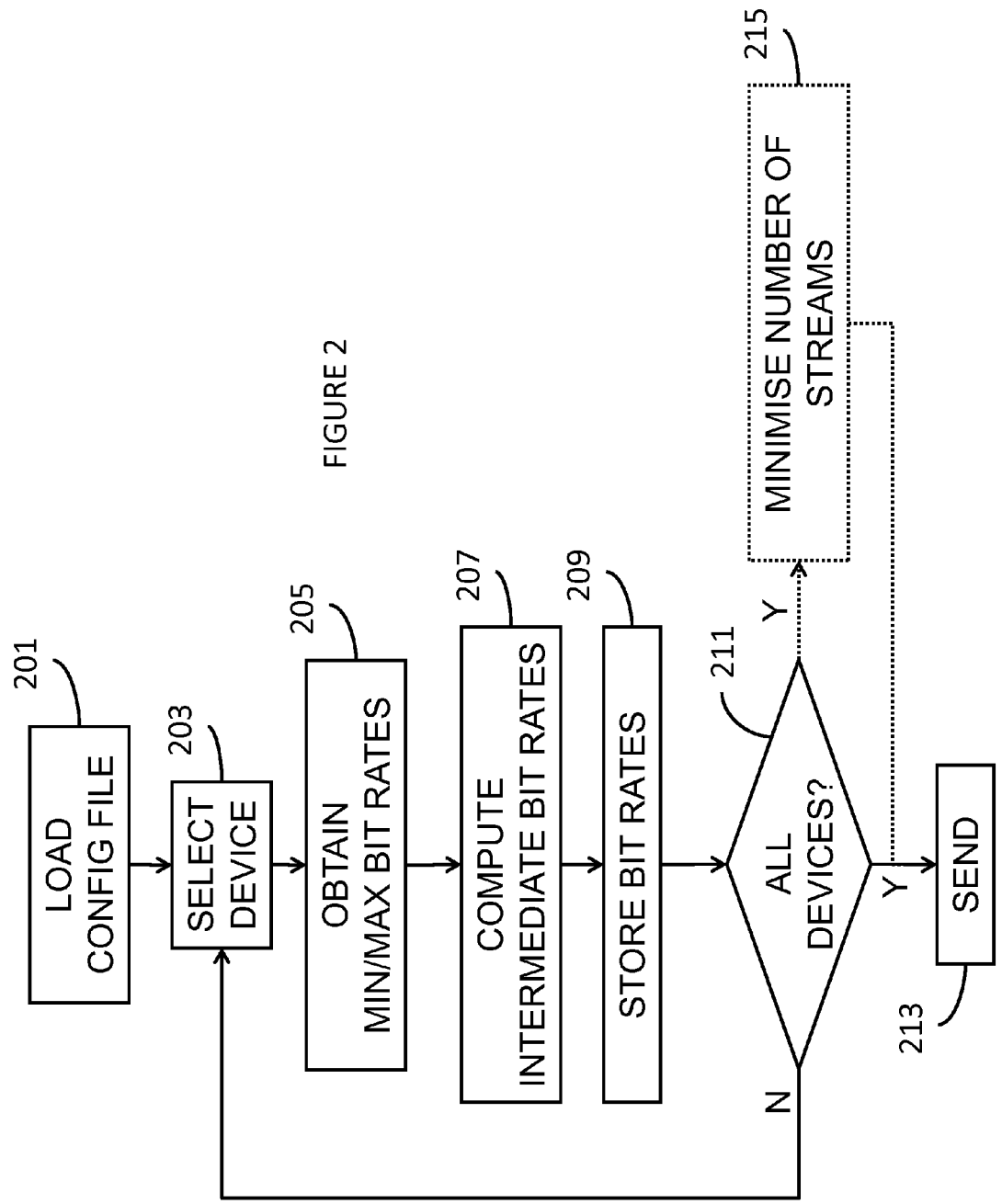
FIG. 2 is a flow chart showing a method in accordance with embodiments of the present invention.

Referring now to FIG. 2, ADM 107 first loads the configuration file (step 201) and then selects the first device from the list of devices found in the configuration file (step 203). For the first device, ADM 107 obtains the minimum bit rate of compressed video that is suitable for the display of video on the device (MiBR) and also obtains the maximum bit rate of compressed video that can usefully be processed by the device (MaBR) (step 205).

It will be recalled that an indication of the number of encoded streams (the number of sub-channels each at a different bit rate) that are to support each device of devices 103 can be provided to ADM 107. In certain embodiments, the ADM 107 uses the indication of the number of encoded streams (CH) to compute a bit-rate differential (BRD) that can be used to calculate the intermediate bit-rates (step 207). In these embodiments, a constant bit rate differential can be computed according to the (non-limiting) example formula shown below:

$$BRD=(MaBR-MiBR)/(CH-1)$$

The intermediate bit-rates can then be computed according to:

$$IBR_n=IBR_{n-1}+BRD$$

for n=1 to (CH−2), where $IBR_0$=MiBR.

Assuming a value for CH of 4, this would result in the following bit rates (in Mbit/s) for the first device in the configuration file: 0.4, 0.73, 1.04 and 1.4.

It will further be recalled that an indication of the optimal bit-rate differential(s) between encoded streams (sub-channels) that will enable a substantial yet seamless jump between bit rates on each device can be provided to ADM 107.

In some embodiments, a constant bit-rate differential BRD can be provided to ADM 107.

The intermediate bit-rates (IBR) can then be computed according to:

$$IBR_n=IBR_{n-1}+BRD$$

From n=1 (where $IBR_0$=MiBR) until $IBR_n$>MaBR.

It will be realized, however, that at lower bitrates, even a small increase if bit rate may typically provide a significant improvement in quality, while at higher bitrates, only a larger increase in bit-rate would typically make a difference to the quality. Thus, in other embodiments, the bit-rate differential can be set according to the (non-limiting) example schema below:

$BR<1$ Mbit/s, $BRD=0.35$ Mbit/s $1$ Mbit/s$\leq BR<2$ Mbit/s, $BRD=0.5$ Mbit/s $2$ Mbit/s$\leq BR<4$ Mbit/s, $BRD=0.75$ Mbit/s $4$ Mbit/s$\leq BR$, $BRD=1.1$ Mbit/s where:
BR indicates the bit-rate; and
BRD indicates the bit-rate differential.

The intermediate bit-rates can then be computed according to:

$$IBR_n=IBR_{n-1}+BRD$$

From n=1 (where $IBR_0$=MiBR) until $IBR_n$>MaBR.

Assuming use of the example scheme described above, this would result in the following bit rates (in Mbit/s) for the first device in the configuration file: 0.4, 0.75, 1.1 and 1.4.

It will be apparent to someone skilled in the art that other methods for computing a set of bit rates can be used. For example, it is possible to define a non-linear relationship between bit-rate (BR) and quality (Q) such that $$Q=f(BR)$$

One example might be:

$$Q=k*\sqrt{BR}$$

Assuming n bit-rate streams, at fixed intervals of quality, a minimum quality $Q_{min}$ and a maximum quality $Q_{max}$:

$$B = \left\{ f^{-1}\left(Q_{min} + i \times \frac{(Q_{max} - Q_{min})}{n-1}\right) \middle| i \in (0 \ldots n-1) \right\}$$

Or, where $Q=k*\sqrt{BR}$ $$B = \left\{ \left[\frac{Q_{min} + i \times \frac{(Q_{max} - Q_{min})}{n-1}}{k^2}\right] \middle| i \in (0 \ldots n-1) \right\}$$

Where B is the set of bit-rates.

The bit rate values for the first device are then stored by ADM 107 (step 209). ADM 107 then checks to see if all devices listed in the configuration file have been processed (step 211).

If not all the devices have been processed then ADM 107 repeats steps 203 to 211 in order to compute suitable bit rates for each device of devices 103.

If all the devices have been processed then ADM 107: creates an encoder/packager configuration file (not shown) and sends it to multi bit-rate encoder 109 and to packager 113; and also creates a catalogue configuration file and sends it to catalogue server 115 (step 213).

In alternative embodiments, ADM 107 may instead send the encoder/packager configuration file to the packager 113 and instead send a list of all the computed bit rates to the multi bit rate encoder 109.

In the present embodiment, the format of the encoder/packager configuration file is a list of septuplets having the form "D; SS; OS; BR; IFF; URL; EA", where:

D indicates the type of device (e.g. Smartphone, Tablet, Laptop, Desktop, Standard Definition Television (SDTV), High Definition Television (HDTV), etc.);

SS indicates the screen size of the device in inches, which can vary from 3.5" for a smartphone up to 42" and larger for a television;

OS indicates the operating system running on the device (e.g. iOS from Apple, Android from Google, Windows 7 from Microsoft, Blackberry from RIM, Fusion (a set top box operating system) from NDS, etc.);

BR comprises a list of all the bit rates computed by ADM 107 for the device;

IFF indicates the index file format suitable for the device (e.g. M3u8, iSMV, proprietary, etc. It will be appreciated that the index file format suitable for a device will depend (at least in part) on the operating system running on the device);

URL is a universal resource locator (URL) which the device can use to access the index file appropriate for it (e.g. according to the screen size, operating system etc. of the device); and EA indicates the encryption algorithm suitable for the device (e.g. AES-CBC, AES-NSA, AES-CTR, etc.)

In the present embodiment, the format of the catalogue configuration file is a list of quadruplets having the form "D; SS; OS; URL", where:

D indicates the type of device (e.g. Smartphone, Tablet, Laptop, Desktop, Standard Definition Television (SDTV), High Definition Television (HDTV), etc.);

SS indicates the screen size of the device in inches, which can vary from 3.5" for a smartphone up to 42" and larger for a television;

OS indicates the operating system running on the device (e.g. iOS from Apple, Android from Google, Windows 7 from Microsoft, Blackberry from RIM, Fusion (a set top box operating system) from NDS, etc.); and URL is a universal resource locator (URL) which the device can use to access the index file appropriate for it (e.g. according to the screen size, operating system etc. of the device).

Multi bit-rate encoder 109 takes a media signal 111 (typically an audio-video signal), encodes the media at the plurality of different bit-rates received from ADM 107 and encapsulates it for transport. Encoding is typically to a format that is supported by all devices 103, for example (but not limited to) H.264/MPEG-4 AVC video and High-Efficiency Advanced Audio Coding (HE-AAC) audio. Multi bit-rate encoder 109 delivers the encoded media streams (typically as MPEG-2 Transport Streams—a packaging format that can be used with a number of different compression formats) to packager 113. Although not shown in FIG. 1, there may be further multi bit-rate encoders receiving media signals and instructions from ADM 107 (or another ABR decision maker).

Packager 113 receives the encoded media streams from multi-bit rate encoder 109 and breaks each stream up into chunks before 'pushing' (i.e. transmitting) the chunks to a content delivery network (CDN) 117 (http://en.wikipedia.org/wiki/Content_delivery_network) within network 119. Packager 113 also creates a separate index file for each device of devices 103 according to the instructions received in the encoder/packager configuration file. For each device, the index file contains references to each of the individual chunks for each of the various encoded media streams available to that given device. Packager 113 then 'pushes' the index files to CDN 117.

Catalogue server 115 provides, on request, each device of devices 103 with the URL of the index file created for that device, which enables each device to retrieve the appropriate index file from CDN 117 and use it to select the appropriate encoded media stream.

In alternative embodiments, packager 113 also encrypts each chunk with an encryption key before pushing the chunk to CDN 117.

In the above described embodiments, ADM 107 sent all the bit rates computed for each device in the list of devices of the configuration file to multi bit-rate encoder 109 and to packager 113. In alternative embodiments, it may be desirable to first minimize the number of bit rates in order to minimize the bandwidth used by the system since the more bit-rates that are defined, the more bandwidth will be used. Minimizing the number of bit-rates also helps minimize the storage requirements in CDN 117. It may also be desirable to minimize the number of bit-rates in order to meet any previously specified limits on total number of sub-channels (or total number of bit rates) that can be created for an item of audio video content, or a total bit-rate that can be supported across all sub-channels can be provided to ADM 107, or a total number of sub-channels (or total number of bit-rates) that can be supported per encoder/packager, or a total bit-rate that can be supported per encoder/packager. Minimizing the number of bit rates is achieved, for example, by unifying bit-rates that are close together or omitting some bit-rates altogether in favour of other bit-rates that are close to the omitted one(s). Once the set of bit-rates has been minimized and optimized (optional step 215), the revised set of bit rates is sent by ADM 107 using one of the methods described above.

Finding the minimal number of bit-rates can be formulated as an optimization problem. The starting point is the list of bit rates for each device as computer by ADM 107. Then a cost function f( ) is defined. For example, one such cost function sums all the bandwidths required to support a certain ABR configuration. Other cost functions factor in the degradation in user satisfaction as certain bit rates are omitted or unified. The techniques for solving optimization problems are collectively known as optimization algorithms. Generally, these methods try to minimize the cost function f( ) by taking iterative steps in order to decrease it. For example, a step can consist of unifying two bit-rates that are close together or omitting one bit-rate in favour of another bit-rate that is close to the bit-rate to be omitted. An optimization algorithm typically uses a stopping criterion. For example, the iteration to minimize the cost function f( ) continues until the cost function f( ) reaches some acceptable threshold value; or continues until the improvement rate in the cost function f( ) is too small (or even non-existent).

One optimization algorithm is known as steepest-decent (SD) or gradient decent (see http://en.wikipedia.org/wiki/Gradient_descent). This is a greedy algorithm that always takes the step that gives the greatest improvement, e.g. the unification of bit-rates or the omission of a bit rate that will provide the largest bandwidth saving.

SD can get stuck on a local minimum and therefore to prevent this from happening, SD can be enhanced using a technique called simulated annealing (http://en.wikipedia.org/wiki/Simulated_annealing).

Finding the minimal number of bit-rates can also be formulated as a clustering problem. For example, a technique called K-means clustering (http://en.wikipedia.org/wiki/K-means_clustering) attempts to optimally approximate n bit rates into k clusters in which each bit rate belongs to the cluster with the nearest mean. K-means uses a metric function for measuring distances between points. If several tries of K-means for a certain value of k reach a poor approximation, it is an indication that the parameter k should be increased.

Referring to FIGS. 3a and 3b, FIG. 3a is an indication of the bit rates (in Mbit/s), for four devices, computed by ADM 107 according to the bit rate differential method described previously and shown in the table below:

| Device | Bit Rates (Mbit/s) |
| --- | --- |
| 3.5" Smartphone | 0.4; 0.75; 1.1; 1.4 |
| 9.7" Tablet | 0.5; 0.85; 1.2; 1.4 |
| 21.5" Desktop | 0.7; 1.05; 1.55; 2.05; 2.8; 3.1 |
| 42" HDTV | 3.0; 3.75; 4.5; 5.6; 6.7; 7.0 |

It can be seen from the table above and from FIG. 3a that ADM 107 computes 19 different bit-rates.

FIG. 3b is an indication of the bit rates (in Mbit/s) for the same four devices after the initial set of bit-rates (as shown in FIG. 3a and the table above) have been optimized and minimized according to one of the methods as described previously. The bit rates that are then sent by ADM 107 to multi bit-rate encoder are shown in the table below:

| Device | Bit Rates (Mbit/s) |
| --- | --- |
| 3.5" Smartphone | 0.5; 0.75; 1.15; 1.4 |
| 9.7" Tablet | 0.5; 0.75; 1.15; 1.4 |
| 21.5" Desktop | 0.75; 1.15; 1.4; 2.05; 2.8; 3.1 |
| 42" HDTV | 3.1; 3.75; 4.5; 5.6; 7.0 |

It can be seen from the table above and from FIG. 3b that ADM 107 sends details of 11 bit-rates to multi-bit rate encoder (as opposed to the 19 different bit-rates previously computed).

It will be noticed that certain bit-rates initially computed by ADM 107 have been omitted (e.g. 0.4 Mbit/s; 0.7 Mbit/s; 1.55 Mbit/s; 3.0 Mbit/s; 6.7 Mbits) while certain bit-rates have been unified (e.g. 1.1 Mbit/s and 1.2 Mbit/s unified to 1.15 Mbit/s).

It will also be noticed that the minimum bit rates for the smartphone, desktop and HDTV have all been increased as a result of the minimization/optimization and that this will have an effect on the bandwidth usage. In alternative embodiments, the minimum bit rates may also be reduced by the minimization/optimization so as not to increase the bandwidth usage. However, this may have an adverse effect on the viewing experience.

It will further be noticed that the maximum bit rates for all four devices have been respected. In alternative embodiments, maximum bit rates may either be increased or reduced by the minimization/optimization although this may have an adverse effect on the bandwidth usage or viewing experience respectively.

In alternative embodiments, by providing ADM 107 with additional information related to the number of people owning and/or using each device of devices 103, the algorithms described above can be improved to give more weighting to bit-rates associated with more popular devices.

In alternative embodiments, devices 103 can periodically report to ADM 107 which bit-rates are being used and possibly also the number of buffered packets. On receiving such feedback from one or more of devices 103, ADM 107 can take this feedback into account when computing the set of bit-rates. This may result in ADM 107 updating the encoder/packager configuration file with a recomputed set of bit-rates. Consequently, multi bit-rate encoder 109 may encode the media at a new or altered bit-rate and deliver the newly encoded media stream to packager 113, which will break the stream up into chunks, 'push' the chunks to CDN 117 and create new index files for those devices affected by the newly computed or altered bit-rates.

For example, if while consuming ABR content, a particular device of devices 103 'oscillates' between two bit-rates (i.e. switches back and forth between two different bit-rates because, for example, one is too high and the other one is too low), the particular device can be configured to report this switching information back to ADM 107. If ADM 107 receives such switching information from enough devices, ADM 107 can be configured to re-compute the bit-rates taking this switching information into account. ADM 107 may create a new bit-rate or move an existing bit-rate (while taking into account how this will affect all other devices in the system). The bit-rates selected by ADM 107 are dynamic and optimized, and may change over time to provide the best quality of video to each device at the lowest system bandwidth.

In the above described embodiments, ADM 107 was described as setting up the ABR configuration of the system. Additionally, and in alternative embodiments, the methods described above can be used to enable progressive download functionality (http://en.wikipedia.org/wiki/Progressive_download) usable by one or more devices of devices 103. In such alternative embodiments, desired PDL functionality can be flagged in configuration file 105, which can be modified to become a septuplet rather than a sextuplet. The additional variable could be a PDL flag, which if set, indicates that ADM 107 should process the device with a PDL flag in order to compute a PDL bit rate and create a PDL index file for the flagged device. For a PDL flagged device, the index file will typically only contain references to chunks encoded at a single bit-rate, typically the maximum useful bit-rate for the PDL flagged device. Advantageously, these alternative embodiments can enable both ABR and PDL functionality form a single content ingest process (i.e. the same encoded chunked audio video streams can be used for both ABR and PDL functionality).

In alternative embodiments, by providing ADM 107 with additional information related to the typical bandwidths provided to users' homes (e.g. over ADSL broadband, cable broadband, etc.) and the typical throughput during peak viewing hours, the algorithms described above can be improved to give more weighting to more popular bit-rates. In such embodiments, a breakdown of what percentage of the population has a certain maximum bandwidth available allows weighting of bit-rates. This could be static (for example, using an estimate coverage data available from an operator (e.g. in a given population, 99.7% of the population (i.e. 3 standard deviations) may be able to consistently receive service at a bandwidth between 1 Mbit/s and 5 Mbit/s; or in a given population, a user with a specified bandwidth of 10 Mbit/s is able to receive service at a bandwidth of at least 1 Mbit/s 99.7% of the time), or dynamic (for example, using an audience measurement system (AMS) to collect data on actual stream usage, and re-compute bit-rates streams from time to time). Such measures could be contained within configuration file 105 or this information may be transmitted to ADM 107 independently of configuration file 105.

It will be recalled that it is possible to define a function f such that $f_i(b)$=expected quality of stream at bit-rate b, on device i This might be defined as the percentage of users that will deem the stream to be visually acceptable, or an overall ranking that users give the stream in a test that is then interpolated into a continuous function. It was previously suggested that $$f_i(b)=k_i*\sqrt{b}$$

In other embodiments, other mathematical models that predict the expected quality may be used (e.g. a logarithmic function), which can then be calibrated for each device using empirical data.

It is also possible to specify a weigh function $w_i(b)$ such that:

$w_i(b)$=for a given bit-rate b, the expected percentage of the population
that has device i and is able to receive service at bit-rate b Such a weight function typically determines an importance of a particular bit-rate.

For a given function f, the derivative of f (i.e. df/db) represents the density of sub-channels at that point, i.e. when f is increasing steeply, sub-channels will typically be closer together because a small change in bit-rate makes a big difference in quality, whereas when f becomes more flat, sub-channels will typically be fewer and farther between because only a large jump in bit-rate has a visible effect.

Considering now a function g where:

$$g_i(b)=f_i(b)*w_i(b)$$

the derivative of g typically gives a more accurate measure of expected density of sub-channels, given that in some bit rate ranges, where there are many users effectively using that bit-rate, small changes up to that bit-rate typically make a lot of people happy, whereas small changes past that bit-rate typically make a lot of people unhappy (since they will be unable to use that stream anymore, as they will not have enough bandwidth).

Hence for a given device:

$$dg/db=d(f*w)/db$$

which is a measure of the density of sub-channels in the area of bit-rate b that gives optimal (or near optimal) happiness to users.

Considering a population of users, it is possible to define a function F:

$$F(b) = \int_0^b \sum_i \frac{d(f_i \times w_i)}{db} db$$

which will produce a graph representing the percentage of users (across all devices in a network), that will be satisfied (i.e. happy) with a stream of bit-rate b (or some other useful measure of quality). Sampling $F^{-1}$ at fixed intervals may be an effective strategy for maximizing overall satisfaction.

Additionally, information related to the cost of storage on CDN 117 may also be provided to ADM 107 to use when computing the bit-rates. It will be appreciated that the cheaper the cost of storage on CDN 117, the more bit-rates can be accommodated.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method of distributing audio video content, said method comprising:
    receiving configuration data for a plurality of devices;
    for each device in said plurality of devices, computing a set of bit rates based, at least in part, on said configuration data, producing a set of bit rates across the plurality of devices;
    minimizing a number of bit rates in said set of bit rates across the plurality of devices, based, at least in part, on available bandwidth, and producing from the minimized set of bit rates across the plurality of devices a revised set of bit rates for each device in said plurality of devices;
    encoding audio video content at each bit rate in said revised set of bit rates for each device to produce a plurality of encoded audio video content streams;
    splitting each encoded audio video content stream in said plurality of encoded audio video content streams into chunks to produce a plurality of chunked encoded audio video content streams;
    for each device in said plurality of devices, creating a separate index file, each separate index file comprising references to at least one of said plurality of chunked encoded audio video content streams;
    publishing a locator for each separate index file in a catalogue; and
    transmitting said plurality of chunked encoded audio video content streams and each separate index file to a network.

2. The method of claim 1, wherein said configuration data comprises, for each device in said plurality of devices, one or more of: an indication of device type, screen size, operating system, maximum video resolution, and minimum bit rate.

3. The method of claim 2, wherein said maximum video resolution comprises a maximum video resolution supported by said device and a maximum useful video resolution, said maximum useful video resolution comprising a video resolution above which increases in video resolution will be imperceptible to a human eye.

4. The method of claim 3, said method further comprising: computing a maximum bit rate from said maximum useful video resolution.

5. The method of claim 4, wherein each set of bit rates comprises: said minimum bit rate, said maximum bit rate, and at least one intermediate bit rate between said minimum bit rate and said maximum bit rate.

6. The method of claim 5, said method further comprising: receiving an indication of a number of bit rates to be computed for each set of bit rates; computing a bit rate differential from said number of bit rates, said maximum bit rate and said minimum bit rate; and computing said at least one intermediate bit rate using said bit rate differential.

7. The method of claim 5, said method further comprising: receiving a bit rate differential; and computing said at least one intermediate bit rate using said bit rate differential.

8. The method of claim 7, wherein said bit rate differential is constant.

9. The method of claim 7, wherein said bit rate differential varies with bit rate.

10. The method of claim 1, said method further comprising: encrypting the chunked encoded audio video content streams before transmission.

11. The method of claim 2, wherein said plurality of encoded audio video streams have a common format, and each index file has a format dependent on operating system.

12. The method of claim 1, wherein said computing is additionally based on feedback received from one or more devices in said plurality of devices.

13. Apparatus for distributing audio video content, said apparatus comprising:
means for receiving configuration data for a plurality of devices;
means for computing, for each device in said plurality of devices, a set of bit rates based, at least in part, on said configuration data, producing a set of bit rates across the plurality of devices;
means for minimizing a number of bit rates in said set of bit rates across the plurality of devices, based, at least in part, on available bandwidth, and for producing from the minimized set of bit rates across the plurality of devices a revised set of bit rates for each device in said plurality of devices;
means for encoding audio video content at each bit rate in said revised set of bit rates for each device to produce a plurality of encoded audio video content streams;
means for splitting each encoded audio video content stream in said plurality of encoded audio video content streams into chunks to produce a plurality of chunked encoded audio video content streams;
means for creating, for each device in said plurality of devices, a separate index file, each separate index file comprising references to at least one of said plurality of chunked encoded audio video content streams;
means for publishing a locator for each separate index file in a catalogue; and
means for transmitting said plurality of chunked encoded audio video content streams and each separate index file to a network.

14. Apparatus operable to distribute audio video content, said apparatus comprising:
a bit rate decision maker operable to:
receive configuration data for a plurality of devices;
compute, for each device in said plurality of devices, a set of bit rates based, at least in part, on said configuration data, producing a set of bit rates across the plurality of devices; and
minimize a number of bit rates in said set of bit rates across the plurality of devices, based, at least in part, on available bandwidth, and to produce from the minimized set of bit rates across the plurality of devices a revised set of bit rates for each device in said plurality of devices;
said apparatus further comprising:
an encoder operable to encode audio video content at each bit rate in said revised set of bit rates for each device to produce a plurality of encoded audio video content streams; and
a packager operable to:
split each encoded audio video content stream in said plurality of encoded audio video content streams into chunks to produce a plurality of chunked encoded audio video content streams;
create, for each device in said plurality of devices, a separate index file, each separate index file comprising references to at least one of said plurality of chunked encoded audio video content streams;
publish a locator for each separate index file in a catalogue; and
transmit said plurality of chunked encoded audio video content streams and each separate index file to a network.

15. The method of claim 1, wherein minimizing a number of bit rates in said set of bit rates across the plurality of devices comprises at least one of the following:
unifying bit rates in said set of bit rates across the plurality of devices that are close together; and
omitting bit rates in favor of other bit rates that are close to omitted bit rates.

* * * * *